May 6, 1930.  H. BENIOFF  1,757,354
POLYPHASE OSCILLATOR
Filed Feb. 24, 1927
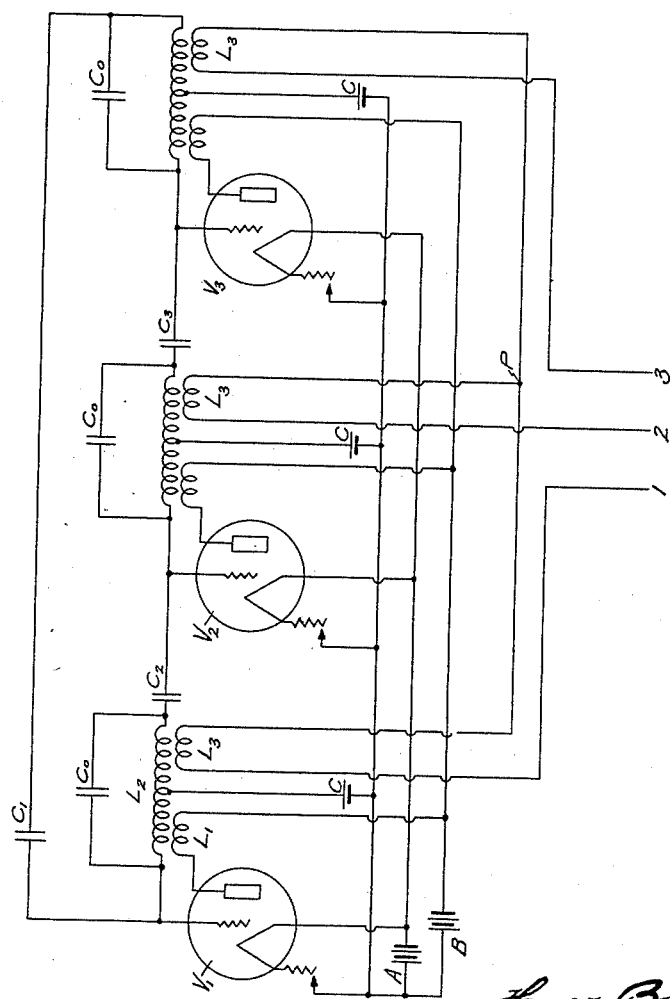
Inventor:
Hugo Benioff,
By Byron Townsend Brickenstein
Attorneys Patented May 6, 1930

1,757,354

UNITED STATES PATENT OFFICE

HUGO BENIOFF, OF PASADENA, CALIFORNIA, ASSIGNOR TO CARNEGIE INSTITUTION OF WASHINGTON, OF WASHINGTON, DISTRICT OF COLUMBIA, A CORPORATION OF THE UNITED STATES

POLYPHASE OSCILLATOR

Application filed February 24, 1927. Serial No. 170,716.

This invention relates to the generation of polyphase oscillations by means of vacuum tubes.

It has been suggested that a number of vacuum tube circuits adapted to oscillate at the same frequency could be interconnected to produce polyphase oscillations of that frequency. Such polyphase oscillations have been unstable in operation, due presumably to slight variations in the values of homologous elements.

An object of the invention is to provide apparatus for the generation of polyphase oscillations which will be comparatively stable in operation. More specifically, an object is to provide apparatus for the generation of polyphase oscillations in which the interphase coupling of the two circuits which provide successive phases is between non-homologous points in those circuits. The accompanying drawing is a circuit diagram of a three-phase oscillator constructed in accordance with the invention.

In the drawing the characters $V_1$, $V_2$, $V_3$, indicate the three vacuum tubes which are provided with networks adapted to produce oscillations of substantially the same frequency. The network of each tube includes the plate inductance $L_1$, grid inductance $L_2$ and the output coil $L_3$. The three coils on each tube are in inductive relation to each other and the grid inductance is shunted by a tuning condenser $C_0$. An intermediate point of each grid inductance is connected to the filament of that tube through a grid bias battery C. The filaments of the tubes are energized in parallel from the filament battery A and the plates are supplied from a common battery B. Homologous sides of the three output coils are brought to a common point P and the other terminals of the coils are connected to the respective lines 1, 2 and 3 of the three-phase output circuit.

The interconnection of the three oscillatory networks is provided by the interphase coupling condensers $C_1$, $C_2$, and $C_3$. The coupling condensers are not connected between homologous points in the network of two adjacent phases but between non-homologous points. The grid of tube $V_1$ which supplies energy to terminal 1 of the output line is connected through the condenser $C_1$ to the lower side of the grid coil of tube $V_3$ which supplies the third phase. Similarly, the grid of tube $V_2$ is connected to the low side of the grid coil of tube $V_1$, and the grid of the tube $V_3$ is connected to the low side of the grid coil of tube $V_2$.

In constructing a polyphase oscillator, homologous elements of the several oscillating circuits should preferably be of substantially the same value. Some variation in the actual values may occur without causing instability but no definite figures can be stated for the amount of variation which is permissible in any given case. Stability in operation is not dependent upon the critical adjustment of the homologous elements and therefore polyphase oscillators may be readily constructed in accordance with the invention.

From an inspection of the diagram it will be noted that if the circuit will oscillate at all it must oscillate three-phase since no two grids can be at the same potential at the same time. In view of the exceedingly complex nature of the circuit a mathematical demonstration of the production of three-phase current has not been made but the circuit as illustrated in the diagram has been successfully operated for the generation of three-phase oscillations.

It will be apparent that two-phase oscillations as well as polyphase oscillations of more than three phases may be constructed in accordance with the invention. The generation of stable polyphase currents is believed to be dependent upon the particular coupling between the several oscillatory circuits of similar design but is believed to be independent of the particular design of the separate oscillatory circuits. Although electrostatic coupling has been described, it will be obvious that the interphase coupling may be resistive or inductive.

I claim:

1. A three phase vacuum tube oscillator comprising three networks adapted to oscillate at substantially the same frequency, and a coupling between the grid circuit of each of said networks and the grid circuit of the other two networks, the coupling of any two networks being between a point in one which is at substantially grid potential of that network to a point in the other network which is at a potential differing materially from the grid potential of said other network.

2. A three phase oscillator as set forth in claim 1, wherein the said couplings are electrostatic and extend from the grid terminal in one network to the filament terminal in an adjacent network.

In testimony whereof, I affix my signature.

HUGO BENIOFF.